UNITED STATES PATENT OFFICE.

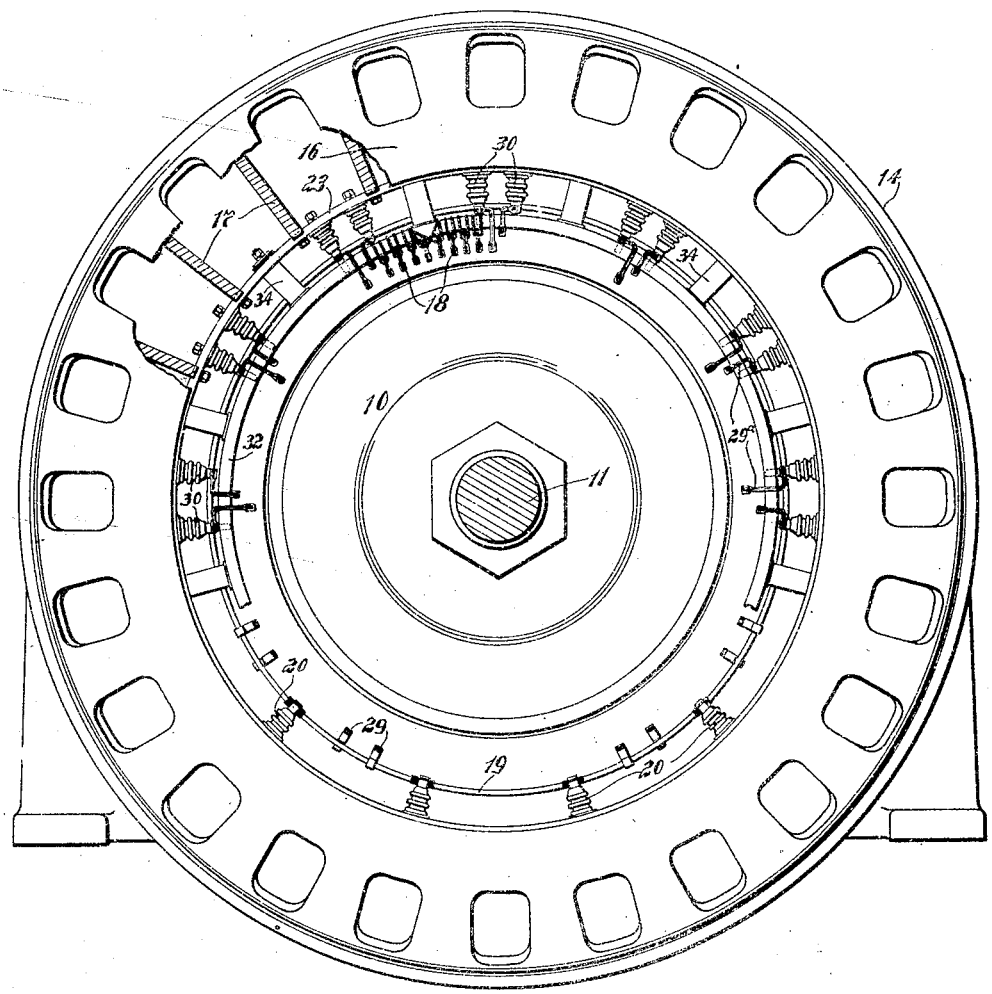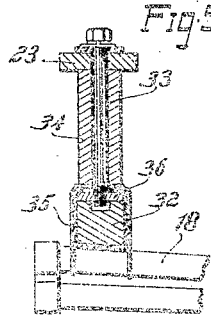

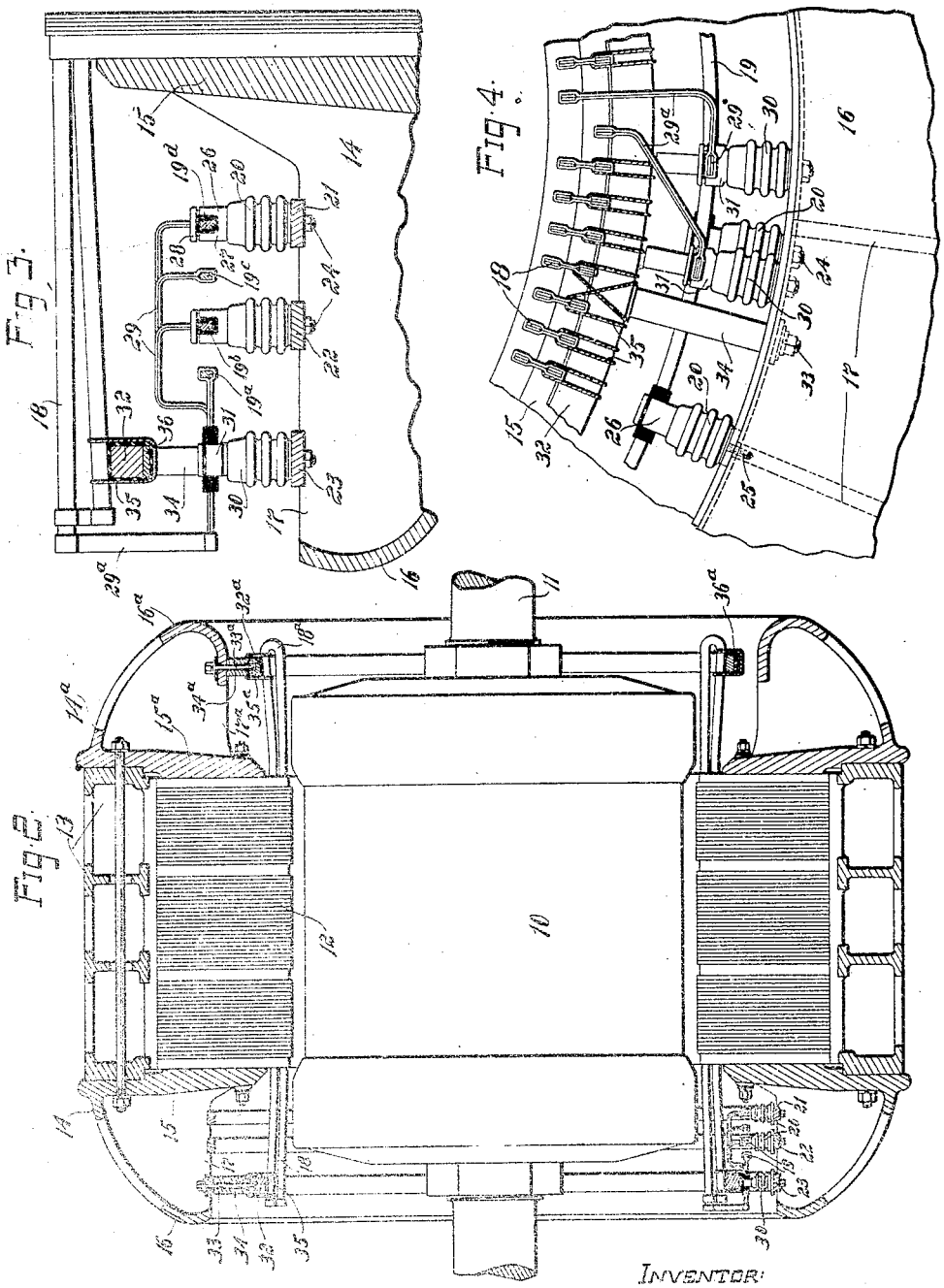

BERNARD ARTHUR BEHREND, OF NORWOOD, OHIO, ASSIGNOR TO ALLIS-CHALMER COMPANY, A CORPORATION OF NEW JERSEY, AND THE BULLOCK ELECTRIC MANUFACTURING COMPANY, A CORPORATION OF OHIO.

DYNAMO-ELECTRIC MACHINE.

1,000,066.   Specification of Letters Patent.   Patented Aug. 8, 1911.

Application filed November 27, 1905. Serial No. 289,222.

*To all whom it may concern:*

Be it known that I, BERNARD A. BEHREND, citizen of the United States, residing at Norwood, in the county of Hamilton and State of Ohio, have invented certain new and useful Improvements in Dynamo-Electric Machines, of which the following is a full, clear, and exact specification.

My invention relates to dynamo-electric machines and especially to large multiphase alternators designed for high voltage and high amperage. In designing such machines special attention must be paid to the insulation and supports for the armature cross-connectors or end-connectors between the windings of the poles of the different phases and to the supports for the armature end-turns. In machines as ordinarily constructed, designed for comparatively low voltages, the cross-connectors or end-connectors are crowded together in a small space and the end-turns are left unsupported. In high voltage machines, however, the cross-connectors must be spaced apart and from the frame of the machine. In order to prevent short circuit between the phases, the distance between the cross-connectors must be sufficient to provide a safe insulation for the highest voltage of the machine.

Therefore one of the objects of my invention is to so support and insulate the cross-connectors or end-connectors from each other and from the frame of the machine that all danger of short circuit will be eliminated.

Between the adjacent end-turns of the armature coils, there are magnetic actions due to the fields of force surrounding the coils. Under ordinary working conditions, the magnetic actions are not sufficiently great to cause any damage. If the machine is short circuited, however, the magnetic fields become so great and the magnetic actions between the adjacent coils are so intensified that the end-turns may be twisted out of place and considerable injury may result.

The second object of my invention is to so support and hold the end-turns of the coils that this danger of injury, due to the magnetic actions in case of accidental short circuit, is avoided.

In carrying out one part of my invention I provide means for supporting and holding in fixed positions, the cross-connectors or end-connectors between the poles of the armature winding of an alternating current dynamo-electric machine.

In another aspect, my invention consists in a multiphase alternating current dynamo-electric machine, having a stationary armature comprising a core and end-members, armature coils having cross connectors between the poles of each phase, and a plurality of insulating supports mounted on one of the end members for holding the cross-connectors from each other and from the frame of the machine, whereby short circuit between the cross-connectors is avoided.

More specifically considered, I provide an end-member of a stationary armature of a multiphase alternating current dynamo-electric machine with a plurality of supporting ribs or brackets. On the inner faces of the ribs or brackets of one of the end-members I fix several rings or bands at suitable distances apart. On these rings I arrange a large number of insulating bushings for supporting the end-connectors which join the adjacent poles of the winding of each phase. Also on the outer ring I mount a plurality of radial studs which carry on their inner ends a ring of insulating material for supporting the end-turns of the armature coils, which project outwardly beyond the cross-connectors, whereby all the conductors will be securely held in fixed positions and each conductor will be safely insulated from the adjacent conductors.

My invention still further consists in the details of construction and combinations of elements described in the specification and set forth in the appended claims.

For a better understanding of my invention reference is had to the accompanying drawing in which—

Figure 1 is an end view of a large multiphase turbo-alternator having a stationary armature and rotary field; Fig. 2 is a longitudinal sectional elevation of the machine, the rotor being shown in elevation; Fig. 3 is an enlarged view of the lower left hand portion of Fig. 2; Fig. 4 is an enlarged end elevation of a portion of the machine; and Fig. 5 is a detail of the coil end-turn support.

Referring to the figures of the drawing I have shown at 10 the rotor, which is in this case the field element of the turbo-alternator, mounted on the shaft 11. The machine illustrated is intended for a four-pole three-phase alternator, but my invention is not restricted in its application to this particular type of machine. The armature core 12, which consists of groups of laminæ, is mounted on a circular outer frame 13, having end-members 14 and 14ª, which consist of end-plates 15 and 15ª, end-shields or end-bells 16 and 16ª, and radial ribs 17 and 17ª. The armature core is slotted in the usual manner and is provided with a three-phase distributed winding consisting of coils having end-turns 18 and 18ª. As shown in Fig. 2, the end-member 14 at the left side of the machine and the end-member 14ª at the right side of the machine are different. The ribs and end-shield of the end-member 14ª approach nearer the rotor than the ribs and end-shield of the member 14. The ribs 17 and end-shield 16 of end-member 14 are machined or cut away from the rotor so as to provide space between the ribs and the end-turns for the cross-connectors for the poles of the winding of each phase.

The cross-connectors proper are shown at 19. They are arc-shaped and are arranged in four circles 19ª, 19ᵇ, 19ᶜ and 19ᵈ side by side but spaced from each other. Each cross-connector extends a suitable distance around the armature in the arc of the circle and is connected at each end by two strap connectors to a pole of the winding of one of the phases. These arc-shaped and strap conductors join the adjacent poles of the winding of each phase. I have in this case for the sake of clearness, called the arc-shaped conductors, the cross-connectors or end-connectors, although the complete connection between two adjacent poles includes an arc-shaped conductor and two pairs of strap conductors. Since machines of this type are designed for many thousands of volts, there may be a great difference of potential between adjacent cross-connectors and between the cross-connectors and the frame of the machine. It is therefore necessary that the cross-connectors be held at fixed predetermined distances apart and from the frame of the machine, to provide a sufficient insulation between the connectors and the frame. I space my cross-connectors apart and support each one on a porcelain insulator 20. Each cross-connector may be supported by one or more of these insulators. As shown in Figs. 2 and 3, three metallic rings 21, 22 and 23 are seated in notches in the inner faces of the ribs or brackets 17. These rings are spaced apart, the outer ring 23 being slightly larger than rings 21 and 22 and being spaced a greater distance from ring 22 than ring 22 is from ring 21. As shown in Figs. 1 and 4 the insulators 20 are arranged at irregular intervals about the circumference of the machine. Part of these insulators are supported on the ribs 17 and the others on the metallic rings 21 and 22, the cross-connectors and ribs being so arranged that the insulators 20 which support the cross-connectors in circles 19ª and 19ᶜ can be supported directly on the ribs 17. The other insulators 20, which are located between the ribs, are supported on the metallic rings 21 and 22. The insulators in circle 19ᵇ are supported on the ring 22, and the cross-connectors in circle 19ᵈ are supported on ring 21. The insulators are fastened to the rings by bolts 24. The other insulators are held to the ribs 17 by screws 25 as is shown in Fig. 4. As shown in the drawing each insulator is provided at its inner end with a cleat or clamp 26 for supporting a cross-connector. Each cleat or clamp is provided with a base 27 secured to the insulator and with a cap 28. The cleats are provided with open passageways for the cross-connectors.

The cross-connectors are joined to the end-turns 18 of the coils by axial strap conductors 29 and radial strap conductors 29ª. The strap conductors 29 are also spaced apart and are held in cleats supported on insulators 30 which are mounted on the outer ring 23. As shown in Fig. 3 each strap conductor 29 is provided with horizontal portion which is held in a cleat 31 similar to the cleat 26 in which the cross-connectors themselves are held. Since the horizontal portions of the conductors 29 are arranged at right angles to the cross-connectors 19, the cleats in which the conductors 29 are mounted are turned at right angles to the cleats 26, in which the cross-connectors are mounted. This is clearly shown in Fig. 3.

The outer ring 23 in addition to supporting the insulators 30 supports the studs which hold the end-turns 18. It has been found that in case a machine is short circuited, the end-turns may be twisted and distorted out of place, on account of the magnetic actions due to the fields surrounding the coils. Ordinarily the magnetic actions are not sufficient to displace the end-turns, but if the machine is short circuited, the fields are so intensified and the magnetic actions become so great that the end-turns may be twisted out of place. In order that this may not occur in case of short circuit, I tie each of the end-turns to a surrounding insulating ring. The ring 32 as shown at the left of Fig. 2 is mounted on the inner ends of bolts 33 which are supported on the ring or band 23 previously referred to. As shown the bolts are surrounded by insulating, preferably wooden, spacing bushings or sleeves 34. Each end-turn 18 rests against the ring 32, and is bound thereto by cord, wire, or tape 35. The wooden ring is preferably surrounded by an iron ring 36 into which the inner ends of the bolts 33 are screwed. The construction is shown in detail in Fig. 5. The end-turns 18ª, shown at the right side of Fig. 2, are supported in a similar manner on wooden ring 32ª. The wooden ring is held in place by radial bolts 33ª, the outer ends of which are mounted on an inwardly curved portion of the end-shield or end-bell 16ª. The bolts are surrounded by insulated bushings 34ª. The wooden ring 32ª is surrounded by an iron ring 36ª which is engaged by the inner ends of the bolts 33ª. Each end-turn 18ª is bound to the ring 32ª by cord 35ª in the same manner that the end-turns 18 are bound to the ring 32.

It will be seen that the cross-connectors are suitably insulated from each other and from the frame of the machine and are so supported that there will be no danger of displacement and hence no danger of short circuit. The conductors which join the cross-connectors to the coils are also well supported and insulated from surrounding parts. The end-turns are so supported that there is no danger of displacement.

I do not wish to be confined to the exact details shown. Many changes can be made without departing from the spirit and scope of my invention. I aim to cover in my claims all such changes which might readily suggest themselves to one skilled in the art.

What I claim as new and desire to secure by Letters Patent is:—

1. In a dynamo-electric machine, a stationary armature comprising a hollow cylindrical core and end-members, a plurality of radial ribs in one of said end-members, a supporting ring or band mounted on the inner faces of said ribs, armature coils having end-turns, and a plurality of end-turn supports mounted on said ring or band.

2. In a dynamo-electric machine, a stationary armature comprising a hollow cylindrical core and end-members, a metal ring or band mounted on one of said end-members, and a plurality of radial studs mounted on the ring for supporting the end-turns.

3. In a dynamo-electric machine, a stationary armature comprising a core and end-members, a plurality of radial supports on one of said end members, a ring or band mounted on the inner faces of said radial supports, a plurality of radial studs mounted at intervals on said ring, an insulating ring mounted on the inner ends of said radial studs, and armature coils having end-turns resting on said insulating ring.

4. In a dynamo-electric machine, a stationary armature comprising a hollow cylindrical core and an end member, a plurality of radial supports on said end-member, a ring or band mounted on the inner faces of said radial supports, a plurality of radial studs mounted on said ring or band, an insulating ring mounted on the inner ends of said studs, a plurality of armature coils having end-turns, and means for fastening said end-turns to the insulating ring.

5. In a dynamo-electric machine, a stationary armature comprising a hollow cylindrical core and an end-member, a plurality of radial supports mounted on said end-member, a ring or band mounted on the inner faces of said radial supports, a plurality of radial studs mounted on said ring or band, a wooden ring mounted on the inner ends of said radial studs, an armature winding having end-turns extending adjacent said ring, and means for fastening each end-turn to the wooden ring.

6. In a dynamo-electric machine, a stationary armature comprising a core and end-members, armature coils having end-turns and end-connectors, a plurality of radial supporting ribs in one of said end-members, a plurality of spaced rings or bands arranged side by side on the inner faces of said ribs, and a plurality of insulating supports mounted on said rings or bands for holding said end-connectors in fixed positions.

7. In a dynamo-electric machine, an armature comprising a hollow cylindrical core and end-members, armature coils having end-turns and end-connectors, a plurality of radial supporting members on one of said end-members, a plurality of rings or bands spaced apart and arranged side by side on the inner faces of said radial members, and a plurality of insulating supporting members mounted on each of said rings or bands for holding said end-turns and connectors in place.

8. In a dynamo-electric machine, a stationary armature comprising a core and end-members, armature coils having end-turns and end-connectors, conductors for joining said connectors to the end-turns, and an insulating clamp or cleat for holding each of said conductors in a fixed position.

9. In a dynamo-electric machine, a stationary armature comprising a laminated core and end-members, armature coils having end-turns and end-connectors, conductors for joining said end-turns and end-connectors, a plurality of insulating bushings mounted on one of said end-members, and a clamp or cleat on each of said insulated bushings, for holding said end-connectors and conductors joining the end-turns and end-connectors in fixed positions.

10. In a dynamo-electric machine, a stationary armature comprising a core and end-members, armature coils having end-turns, end-connectors, and conductors joining the end-turns and end-connectors, separate insulating supports for supporting and holding in fixed position each end-connector and each conductor joining an end-turn and end-connector, and means for supporting and holding in fixed position the end-turns of the coils.

11. In a dynamo-electric machine, a stationary armature comprising a core and end-members, armature coils having end-turns, cross-connectors and conductors joining the end-turns and cross-connectors, a plurality of rings or bands spaced from each other and mounted side by side on one of said end members, and a plurality of insulating supports on each of said rings or bands for holding in fixed position the end-turns, the cross-connectors, and the conductors joining the end-turns and the cross-connectors.

12. In a multiphase alternating current dynamo-electric machine having a rotary field-member and a stationary armature which comprises a laminated core and end-members, one of said end-members having a plurality of radial ribs or flanges extending outwardly in an axial direction from the core of the machine, a plurality of rings or bands mounted on the inner faces of the ribs or flanges, said rings or bands being spaced suitable distances apart, a multiphase armature winding having end-turns extending outwardly beyond the said rings or bands, a plurality of end-connectors for the poles of each phase-winding, said connectors being spaced apart and arranged between the end-turns and the rings or bands, a plurality of insulating bushings mounted on said rings or bands, and supporting and holding in fixed positions the said end-connectors, a plurality of radial studs mounted on the outer ring or band and carrying on their inner ends an insulating ring for supporting the end-turns, and means for fastening said end-turns to the insulating ring, whereby all the conductors will be held in fixed positions and will be insulated from each other.

13. In a multiphase dynamo-electric machine having a stationary armature and a rotary field member, a multiphase armature winding, cross-connections between the poles of each winding, the cross-connection between each pair of poles comprising an arc-shaped conductor, and a plurality of strap conductors which connect the arc-shaped conductor to the winding, and insulating supports for the arc-shaped and strap conductors.

In testimony whereof I affix my signature, in the presence of two witnesses.

BERNARD ARTHUR BEHREND.

Witnesses:
LAURA E. WELCH,
ARTHUR F. KWIS.